July 14, 1942. M. McDONALD 2,289,981
ELECTRIC LUBRICATING OIL HEATER FOR AIRCRAFT
Filed Feb. 18, 1941
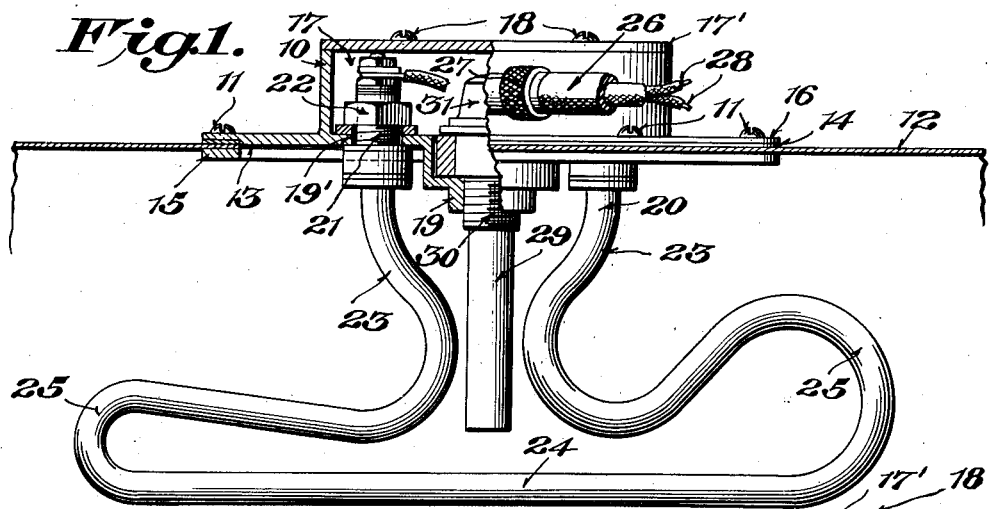
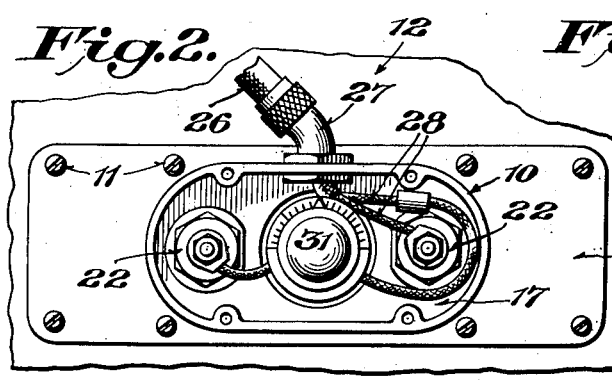
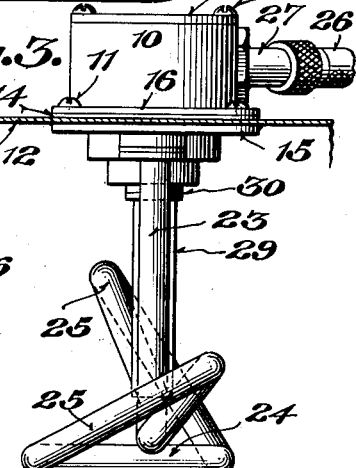
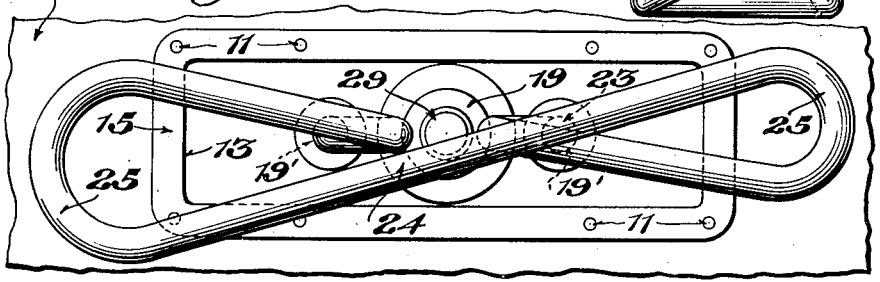
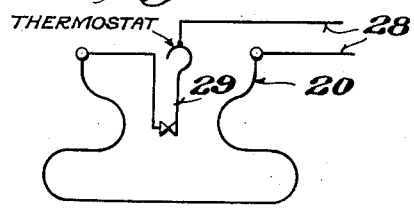
Inventor
Morton McDonald,
Attorneys Patented July 14, 1942

2,289,981

UNITED STATES PATENT OFFICE 2,289,981

ELECTRIC LUBRICATING OIL HEATER FOR AIRCRAFT

Morton McDonald, Miami, Fla.

Application February 18, 1941, Serial No. 379,525

8 Claims. (Cl. 219—38)

The present invention relates to lubricating oil heaters for aircraft and aims generally to improve existing devices for that purpose.

The invention has for its primary objects the provision of an electric heater simple in construction and of extremely light weight which may be incorporated in or attached to the lubricating oil tank of an airplane or other aircraft for ready connection with a source of electric current for maintaining the lubricating oil of the aircraft motor at a proper predetermined temperature when the craft is grounded, thus eliminating long warming-up periods before flight.

A further object of the invention is to provide an electric immersion heater for the purpose specified in which the heating element is so constructed and shaped as to extend over a substantial area of the liquid in which it is immersed and of greater surface area than of the housing by which it is supported, permitting effective heating of the liquid in deep or shallow tanks.

A still further object of the invention is the provision of an improved heater in which the heating element is so constructed and shaped that it will be substantially free from amplified vibrations normally set up in the aircraft or vehicle in which it is mounted.

Other aims and advantages of the invention will be apparent to those skilled in the art in view of the following more detailed description of the invention, reference being had to the accompanying drawing, which illustrates one preferred embodiment of the invention.

In the drawing

Fig. 1 is a central sectional elevation illustrating my improved heater applied to a lubricating oil tank;

Fig. 2 is a top plan view of the heater housing with its cover removed;

Fig. 3 is an end elevation thereof;

Fig. 4 is a bottom plan view; and

Fig. 5 is a diagrammatic view illustrating the electrical connections.

In the embodiment of the invention illustrated in the drawing, the improved heater comprises a housing 10, of some light weight metal such as aluminum, adapted to be suitably attached, as by fastenings 11, to a wall 12 of a lubricating oil tank or the like, surrounding a narrow slot 13 in said tank wall 12. Preferably a gasket 14 is interposed between the tank wall 12 and housing 10 and renders the joint oil tight. The walls of aircraft lubricating oil tanks are of very thin metal, usually .05 inch in thickness, and it is desirable to reinforce this wall around the slot 13, as at 15, and secure the housing 10 within this reinforcement.

The housing 10 preferably comprises a base portion 16 formed with a hollow well 17 on one face thereof adapted to be closed by a cover 17' screwed to the wall, by screws 18 or the like, the well providing a housing for the ends of the heating element, the thermostatic control as well as the electrical connections. To this end the base portion 16 may be formed with a plurality of openings 19 within the well, three being shown, for mounting the heater element and thermostat on the housing 10.

The heater element 20 preferably is an elongated tubular member bent to looped form with its two terminal ends positioned in the end openings 19 of the base portion 16 of the housing 10. The ends of the heater element are preferably threaded as at 21 to receive clamping nuts 22 by means of which the tubular heater element may be securely clamped to the casting.

The loop of the heating element 20 is preferably formed so that all portions lie relatively close to the base 16 of the housing 10 to reduce the depth of the heater so that it may be applied to a shallow tank and also to reduce vibration in the tubular heater element. Thus a substantial length of heater element may be used by bending the element into a substantially T-shaped formation, the arms of the T being preferably disposed longitudinally of the base portion 16.

Immersion heaters heretofore have been usually either of the bayonet or hairpin type, adapted to be mounted at one end in the well of the tank with the body of the heater extending into the tank. Where a substantial length of heater element is required, the end of the heater element, remote from its point of support in the tank wall, is subject to vibration, which if permitted, would loosen the fluid tight connection between the tank wall and heater, causing serious damage. This is particularly true in the case of lubricating oil tanks of airplane motors which are constructed of thin, light weight metal, described above.

According to the present invention the heater element is so constructed and shaped as to reduce or dampen vibration of the engine transmitted to the heater element. The heater element, as stated above, is suspended at two spaced points where it is connected to the housing 10 and the enlarged intermediate looped portion is subject to vibrations of the engine tending to pull the heater element from its support. These vibrations may ordinarily occur in a vertical plane, a horizontal plane or in a plane inclined thereto, depending upon the particular positioning of the heater on the lubricating oil tank, but normally may be considered as being in a plane at right angles to a plane passing through the terminal ends.

The heater element 20, according to the invention, is of novel construction and configuration. As viewed in side elevation, it is of substantial T-shape (Fig. 1), the end portions 23 of the heater element, toward the connection with the housing 10, forming the legs of the T. The head 24 of the T-shaped heater is preferably bent to a substantially figure-eight shape (see Fig. 3), with opposite terminal loops 25 disposed in planes inclined to the plane of the head loop 24 and the end portions 23, and disposed in planes substantially normal to each other (see Fig. 4). Thus, for every part of the heater element loop, there are other parts laterally offset therefrom. Accordingly, if any loop portion of the heater element tends to vibrate in any plane, another portion rigidly connected thereto has a mass disposed at one side of the axis of vibration of the vibrating part, which tends to dampen or retard movement of the vibrating portion in its plane of vibration.

The oil tanks of an airplane engine are usually located close to the engine in an inaccessible position, and for convenience the electric wires for the heater are passed through a shielded cable 26 connected at one end to a receptacle (not shown) on the lower outside of the engine casing or in the cockpit or other more accessible position, and at the other end to a tubular fitting 27 secured to the wall of the housing well 17.

The two electrical conductors 28 are designed to supply proper electric current, preferably 110 volts, to the heater element, one of the wires being connected to one terminal of a thermostat 29. The circuit is completed by connecting the opposite terminal of the heater element with the other terminal of the thermostat.

The thermostat 29 may be of any suitable construction but preferably is of the tubular type comprising a barrel threaded, as at 30, into the housing 10. Adjustment of the thermostat may advantageously be by means of a screw rotated by an operating knob 31, or a screwdriver as desired. The thermostat functions to close the electrical circuit within the heater when the oil is below a predetermined value and to break the circuit between the opposed ends of the heater element when the temperature of the oil reaches a predetermined value. By this means the oil may be maintained at a proper adjustable predetermined temperature.

In practice, a source of electric current is connected to the receptacle (not shown) to supply current to the wires 28, the thermostat having previously been set to the desired temperature for the oil. If and when the tempertaure of the lubricating oil falls below the predetermined value, the thermostat 29 closes, supplying current to the heating element. Heat supplied to the oil by the heating element, sets up a circulation within the oil tank so that oil in the tank remote from the heater is maintained at a high temperature, eliminating long warming-up periods before flight.

The novel construction and configuration of the heater element not only provides a large amount of heater element immersed in the oil for rapid and efficient heating, but materially reduces vibration in the heater element which might otherwise damage the oil tank and the oil supply to the engine. Furthermore, the configuration of the heater enables the element to be inserted through a comparatively smaller opening in the oil tank. In the illustrated construction (Figs. 1 and 3) the length of the head of the T-shaped heater element is approximately 13 inches and this is readily inserted through an opening 8 inches by 2 inches in the oil tank. The whole heater element is of extremely light weight, the illustrated embodiment weighing about three pounds.

As is well known, there is a considerable amount of vibration in airplanes in flight and of course these vibrations are more pronounced in parts, such as lubricating oil tanks located adjacent to the engine. It is desirable therefore to avoid using any part suspended at one end which would be subject to vibrations of increasing amplitude.

According to the invention, the heater element is so shaped that it has substantial portions of its mass laterally offset from each other and disposed in different intersecting planes so that tendency of one portion to vibrate in its plane of vibration is resisted by a dampening effect produced by tendency of an offset part to vibrate in a different plane.

Obviously the invention is not restricted to the details of construction and shape precisely as shown, but embraces other equivalent constructions and arrangements falling within the scope of the appended claims.

I claim:

1. An electrical immersion heater for liquid tanks having an elongated slot, comprising a housing attached to the tank surrounding said slot and formed with a plurality of openings therein, an elongated heating element insertible through the slot in the tank having its opposite ends inserted in two of said openings and its intermediate looped portion extending into said tank, said heater element being of substantially T-shaped configuration with the intermediate looped portion of said heater constituting the head of said T, being generally of a figure 8-configuration and disposed within said tank.

2. An electrical immersion heater for liquid tanks subject to vibration such as lubricant tanks for aircraft, comprising a housing secured to said tank, an elongated tubular heater element having its two terminal ends secured to said housing and its intermediate looped portion disposed in said tank, said looped portion being subject to vibration in a plane normal to the plane passing through the two terminal ends of the tubular looped portion, portions of said heater element being disposed laterally to and on each side of said terminal ends and acting to dampen vibrations of the heater element in said plane normal to the plane of said terminal ends.

3. An electrical immersion heater for liquid tanks subject to vibration such as lubricant tanks for aircraft, comprising a housing secured to said tank, an elongated tubular heater element having its two terminal ends secured to said housing and its intermediate looped portion disposed in said tank, said looped portion being subject to vibration in a plane normal to the plane passing through the two terminal ends of the tubular heater element, the end portions of said looped portion being disposed laterally to and on each side of said terminal ends and acting to dampen vibrations of the heater element in said plane normal to the plane of said terminal ends, said laterally disposed end portions being in planes substantially normal to each other.

4. An electrical immersion heater for liquid tanks comprising a housing secured to said tank, an elongated tubular electrical heater element having its two terminal ends secured to said housing and an intermediate looped portion of generally T-shaped form extending into said tank, the inner head end of said intermediate looped portion being generally of figure-eight configuration.

5. An electrical immersion heater for liquid tanks which are subject to vibration, such as lubricant tanks of aircraft engines, comprising a housing secured to said tank, an elongated electrical heater element having its terminal ends secured to said housing and an intermediate looped portion extending into said tank, said intermediate looped portion being so shaped that laterally spaced portions thereof are disposed in planes substantially normal to each other and angularly inclined to a plane passing through said terminal ends, and acting to restrain vibrations of said heater element with said tank.

6. An electrical immersion heater for liquid tanks which are subject to vibration, such as lubricant tanks of aircraft engines, comprising a housing secured to said tank, an elongated electrical heater element having its terminal ends secured to said housing and extending transversely therefrom and an intermediate looped portion positioned in said tank and extending longitudinally of the housing and beyond the terminal ends thereof, said intermediate looped portion comprising laterally spaced portions disposed in four different intersecting planes, and acting to restrain vibrations of said heater element with said tank.

7. An electrical immersion heater for lubricating oil tanks of aircraft engines and the like having a thin wall section formed with an elongated slot therein, said wall being reinforced around said slot, a housing comprising a base plate and a well portion secured to said reinforced wall, an elongated tubular heating element having its two terminal ends secured to said housing and extending into said well, the intermediate looped portion of said heater element extending into said tank, said looped portion being of substantial T-shape, electrical connections in said housing well including an adjustable thermostat for closing and opening a circuit through said heater element when the oil in the tank is respectively below and above a predetermined temperature.

8. An electrical immersion heater for lubricating oil tanks of aircraft engines and the like having a thin wall section formed with an elongated slot therein, said wall being reinforced around said slot, a housing comprising a base plate and a well portion secured to said reinforced wall, an elongated tubular heating element having its two terminal ends secured to said housing and extending into said well, the intermediate looped portion of said heater element extending into said tank, said looped portion being of substantial T-shape, electrical connections in said housing well including an adjustable thermostat for closing and opening a circuit through said heater element when the oil in the tank is respectively below and above a predetermined temperature, and a shielded electrical conductor connected to said housing wall for supplying current to said connections.

MORTON McDONALD.